Figure 1:
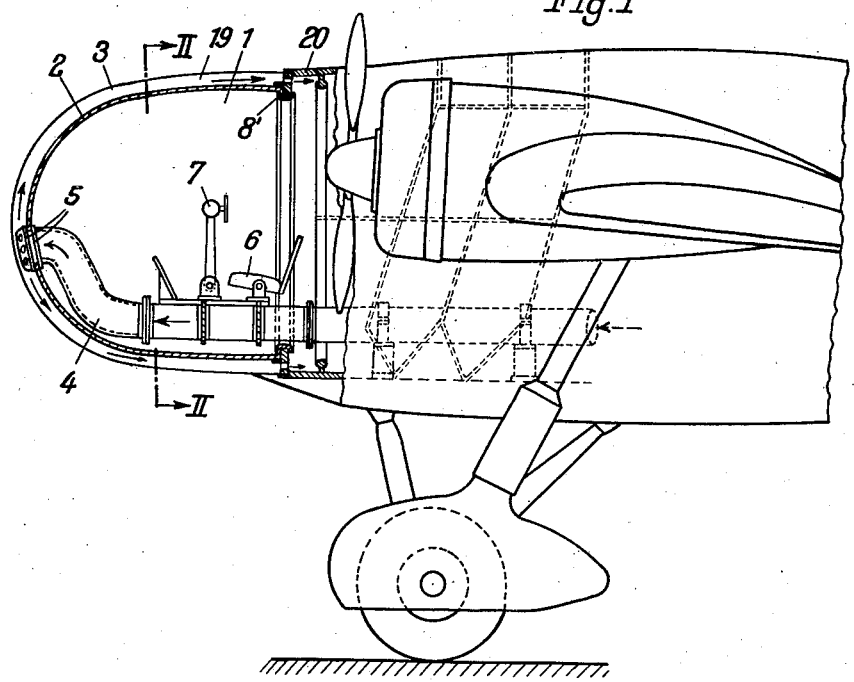

Sept. 5, 1939.   H. WAGNER ET AL   2,171,818
WALL STRUCTURE FOR AIRCRAFT COMPARTMENTS
Filed Dec. 15, 1937    2 Sheets-Sheet 2

Inventors

Patented Sept. 5, 1939

2,171,818

UNITED STATES PATENT OFFICE 2,171,818

WALL STRUCTURE FOR AIRCRAFT COMPARTMENTS

Herbert Wagner and Justus Muttray, Dessau, Germany, assignors to Junkers Flugzeug- und Motorenwerke Aktiengesellschaft, Dessau, Germany Application December 15, 1937, Serial No. 179,875
In Germany December 28, 1936

11 Claims. (Cl. 244—117)

Our invention relates to aircraft and more especially to the accommodation therein of the pilots or other members of the crew.

It is an object of our invention to provide a compartment affording such accommodation, the walls of which are both transparent and strong.

It has already been suggested to make a considerable part of the walls of the compartments serving for the accommodation of the crew in aircraft transparent. Thus for instance in flying machines the whole of the cockpit, which provides such accommodation, has been formed as a large window comprising a great number of panes in order to provide an unobstructed view. The individual panes of these windows are mounted in ledges forming part of a vaulted grid. They transmit the forces which act on them, onto this grid, which forms a supporting structure imparting to the transparent wall the necessary rigidity. Apart from the fact that such grid considerably increases the weight of the craft, difficulties are encountered in so mounting the panes in the grid that the outer surface of the cockpit formed by the ledges of the grid and the panes does not show any projecting or receding parts. The grid also partly obstructs the view and in aircraft exposed to greater differences of temperature and pressure it is further difficult to reliably and tightly mount the panes in place, more especially if these panes consist of a transparent artificial material (artificial resin) liable to expand and contract under the influence of temperature.

According to our invention we avoid these drawbacks by forming the walls of the cockpit or other compartment in aircraft, at least to a considerable part, as a unitary self-supporting shell which is transparent throughout. This transparent wall may surround on all sides the entire compartment or part of same. Preferably the compartment surrounded by the transparent wall is made large enough to offer accommodation for at least one man. It may be arranged at one end of the fuselage or at any point between the ends. Any supporting grid structure can be dispensed with and the wall is thus devoid, as far as possible, of all structural parts which might obstruct the view. Owing to the lack of such structural parts, which were hitherto made strong enough to take up the forces acting on the wall, a great saving of space and an altogether smooth surface are obtained, which allows the air to flow in contact with it without the formation of any local whirls. Being formed as a self-supporting cup-shaped body, this wall is enabled to take up a gas pressure such as arises for instance in the high-altitude cabins of aircraft.

In order to avoid exposing the transparent wall to unduly high stresses by forces locally acting on the wall, for instance weights or mass forces of the loads to be accommodated in the compartment, the steering forces and the like, a separate supporting structure, fixed to the fuselage frame or the like, may extend into the part of the compartment which is surrounded by the transparent wall, and the seats, rudder gear and the like are secured to this supporting structure, which is preferably arranged in such manner as not to obstruct the view. Obviously, if no great forces may be expected to act on the wall, such supporting structures might also be dispensed with.

If the compartment surrounded by the transparent wall is arranged in the cockpit of the craft, the wall is preferably formed as a rotation body, preferably of stream-lined section, so that the wall then possesses great resistivity against gas pressure and is particularly well fitted to act as the wall of an high-altitude cabin or other compartment acted upon by inner pressure above normal.

The wall forming the principal subject matter of this invention may for instance consist of a transparent plastic material such as an artificial resin. In order to obtain a favorable distribution of stresses in the wall material, the wall is preferably connected to the aircraft structure in a plane which extends about normally to the longitudinal axis of the compartment surrounded by it. In fixing the wall to the aircraft body, all perforations, which might impair its strength, are preferably avoided. We prefer forming the edge of the wall with an annular bulging portion which serves as a means for fixing the wall to the fuselage or the like. We prefer holding this annular bulging portion in position on the fuselage by means of an annular setting gripping the bulging portion, this setting being preferably connected to the fuselage in a disengageable manner.

We may also form the wall with an annular bulging portion forming an inwardly extending flange, the inner surface of which is gripped by means of fixation, which pull this flange against an abutment formed on the fuselage. Means may be provided for preventing the wall, thus mounted in place, from being displaced in radial direction relative to the fuselage.

In order to prevent the transparent wall from being exposed to bending stresses at the point of fixation, we provide it at this point with a member, such as a pressure ring surrounding the bulging portion, which takes up radial stresses acting on the wall.

In order to prevent the formation of an ice layer on the transparent wall, which might obstruct the view, we may provide a double wall traversed, between the inner and the outer part, by a heating medium, the temperature of which is so chosen that no deposition of ice on the outer wall can occur. The heating up of the wall further acts towards preventing any change in the properties of the material forming the wall.

Preferably the outer wall may be thinner than the inner wall and may even be constituted by a very thin film, in which case it is preferably relieved of the outer pressure by stays abutted against the inner wall, which is stronger, these stays being preferably located in planes which extend in the direction of flight. In that case the gaseous heating medium is acted upon by a pressure which is substantially equal to the pressure acting on the outside of the outer wall. We thus not only effect a saving in weight, but also obtain a favorable transmission of heat to the outside of the outer wall. In that case the stronger inner wall takes up the stresses arising in consequence of the higher inner pressure, while the outer wall, which, owing to its thinness, opposes only little resistance to the transmission of heat from its inner to its outer surface, is secured against deformation by the pressure exerted on it by the heating medium and by the stays spacing it from the inner wall.

In the drawings affixed to this specification and forming part thereof two embodiments of our invention are illustrated diagrammatically by way of example.

In the drawings

Figure 2:
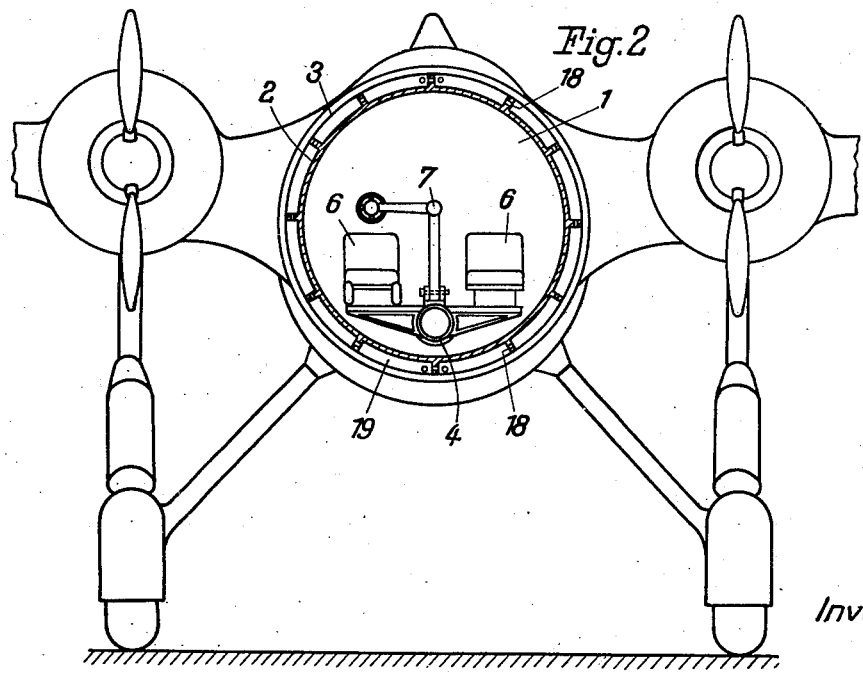

Fig 1.is an elevation, partly in axial section, of the front half of an airplane fitted with a wall according to this invention, Fig. 2 being a cross section on the line II—II in Fig. 1.

Figure 3:
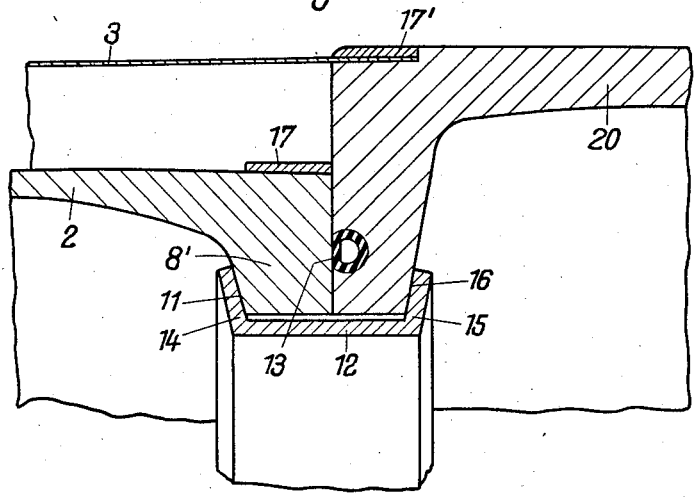
Figure 4:
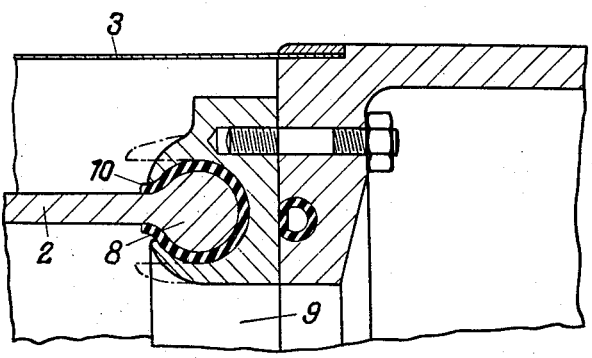

Figs. 3 and 4 are axial sections, drawn to a larger scale, of means for fixing the transparent wall to the fuselage.

Referring to the drawings, 1 is the compartment provided in the cockpit of the craft and 2 is the inner, 3 the outer wall, forming together the transparent double wall surrounding this compartment. The strong inner wall 2 forms a self-supporting cup-shaped body. The two walls are attached to the fuselage structure 20 along a plane extending at right angles to their longitudinal axes. Into the compartment 1 extends the spar 4, which also projects through a perforation of the inner wall, while its rear end is fixed to the fuselage. This spar has the form of a tube serving to supply into the space 19 enclosed between the two walls a gaseous heat carrier or heating medium.

The wall is fixed to the fuselage body, according to Fig. 4, by means of the edge portion 8 of the inner wall, which is enlarged to form a bulging annulus of substantially circular section, which is held in place in the setting ring 9, which is disengageably fixed to the fuselage body and grips the annulus 8 by means of annular jaws, a rubber ring 10 being inserted between the parts to render the fixation yieldable to the extent of sealing the compartment 1 against the escape of air and preventing the annulus 8 from being injured.

In the modification illustrated in Fig. 3 the inner wall 2 is fixed to the fuselage by means of a ring of U-section, the flanges 14, 15 of which grip the inner surface 11 of a flange 8' formed on the edge portion of the inner wall 2 and extending radially inwards, and a corresponding flange 16 formed on the edge portion of the fuselage body 20. Means (not shown) are provided for expanding the ring 12, which may be made in two or more sections, so as to firmly grip and press together the contacting parts. A rubber tube 13 inserted in an annular groove of the flange 16 may serve as an additional packing.

The outer surfaces of the two contacting flanges are preferably inclined, as shown in the drawings, in such manner that the clamping ring, on being expanded, will force them against each other.

In order to avoid bending stresses in the transparent wall 2 at the point where it is attached to the fuselage, a contracting pressure band 17 is placed around this end, which prevents the wall 2 from shifting radially.

In both modifications the film-like outer wall 3 is connected with the body 20 of the craft by cementing, and a band 17' surrounding the place of connection prevents the wall from separating. In order to prevent the formation of ice on the transparent walls, the space 19 between the two parts of the double wall is traversed by a gaseous heat carrier, the temperature of which is sufficiently high to prevent ice formation. In order to secure the best possible heat transmission, the outer wall 3 has the form of a thin film which is braced by stays 18 (Fig. 2) resting on the inner wall. The gaseous heat carrier is acted upon by a pressure which is substantially equal to the pressure acting on the outer wall 3 from the outside. In this manner the form and position of the outer wall are upheld, by means of the stays 18 and of the pressure exerted by the gas, also against the static pressure exerted by the travelling wind.

The heat carrier is supplied to the space 19 through the tubular spar 4 and, travelling in the direction of the arrow, escapes through the flange, to which the inner wall is fixed. In view of the thinness of the outer wall 3 the resistance it offers to the transmission of heat is low. Even with great differences in the temperatures in the space 19 and in the outer air the outer wall 3 thus encounters only a comparatively low drop of temperature, so that even at low atmospheric temperatures the temperature of the outer wall can easily be held above the freezing point, so that any obstruction of the view by the formation of ice is avoided. Apart from this the heating up of the walls 2 and 3 is adapted to preserve the important properties of the material, of which they are composed, even if the temperature should vary within wide limits.

As shown in Fig. 1, the front part of the compartment 1 offers an unobstructed view and all obstructing members such as window-supporting grids are avoided. Furthermore the transparent wall, owing to the self-supporting cup-shaped hollow body 2, takes up all stresses and possesses a great resistivity against forces acting from without, so that it is particularly adapted as an enclosing wall for a compartment serving as high-altitude cabin.

We wish it to be understood that we do not desire to be limited to the exact details of construction shown and described for obvious modifications will occur to a person skilled in the art.

We claim:

1. In aircraft a wall of annular section enclosing a compartment traversed by an axis extending in parallel to the longitudinal axis of the craft, said wall consisting of transparent material throughout and having the form of a self-supporting shell, the inner diameter of which at least equals the height of a seated adult person.

2. The structure of claim 1, in combination with a structural member fixed to the craft and extending into the compartment surrounded by the transparent wall, said member being adapted to take up forces active within the compartment surrounded by said wall.

3. The structure of claim 1, in which the transparent wall has the form of a cupola-shaped rotation body, the diameter of which at least equals the height of a seated adult person.

4. The structure of claim 1, in which the transparent self-supporting shell is a cupola-shaped rotation body arranged at the cockpit of the craft.

5. The structure of claim 1, in which the transparent shell is fixed to the craft in a plane extending substantially normally to the longitudinal axis of the wall.

6. The structure of claim 1, in combination with an inwardly projecting flange at the end of the wall, means for radially gripping said flange and forcing it into contact with the body of the craft and a pressure ring surrounding the flanged portion of the wall.

7. The structure of claim 1, in combination with another transparent wall surrounding the cup-shaped transparent wall with a clearance and means for conducting a gaseous heat carrier through the space enclosed between said walls.

8. The structure of claim 1, in combination with another thinner transparent wall surrounding the cup-shaped transparent wall with a clearance and means for conducting a gaseous heat carrier through the space enclosed between said walls.

9. The structure of claim 1, in combination with another transparent wall surrounding the cup-shaped transparent wall with a clearance, stays resting on the cup-shaped inner wall and extending in the direction of flight serving to brace said outer wall.

10. The structure of claim 1, in combination with another transparent wall having the form of a thin film surrounding the cup-shaped transparent wall with a clearance and means for conducting a gaseous heat carrier through the space enclosed between said walls.

11. The structure of claim 1, in which the transparent shell is a rotation body, which has a wall thickness enabling it to withstand an inner pressure above normal.

HERBERT WAGNER.
JUSTUS MUTTRAY.